United States Patent Office 3,726,854
Patented Apr. 10, 1973

3,726,854
BORON COMPLEXES OF o,o'-DIHYDROXY-
PHENYLAZONAPHTHYL DYES
Charles Edward Lewis, Somerville, N.J., assignor to
American Cyanamid Company, Stamford, Conn.
No Drawing. Filed June 15, 1970, Ser. No. 46,486
Int. Cl. C09b 29/10; D06p 1/08, 1/18
U.S. Cl. 260—197                                    5 Claims

ABSTRACT OF THE DISCLOSURE

A class of boron-chelated o,o'-dihydroxy monoazo dyes for synthetic fibers is provided. The dyes have the formula:

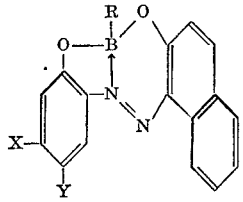

where R represents hydroxy, aryl, alkyl of from 1 to 8 carbon atoms or alkoxy of from 1 to 8 carbon atoms, and X and Y each represent hydrogen, chloro or nitro, provided that where either X or Y is nitro the other is hydrogen. The dyes are made by reacting an o,o'-dihydroxy-arylazo-aryl dye with a polyoxyborane in a non-aqueous, non-polar solvent capable of forming an azeotrope with water. The dyes have the properties of disperse dyes being readily dispersed in a dyebath by dissolving in a low molecular wight, water-miscible solvent and adding to a water bath and producing yellow to orange to red to violet shades on the fibers.

---

The invention relates to new azo dyes. More particularly, it is concerned with a new class of boron-chelated o,o'-dihydroxy monoazo dyes and a process for preparing the same.

The new boron-chelated dyes of the invention are particularly useful for the dyeing of various synthetic fibers, such as nylon, cellulose acetate, polyesters and polypropylene, which have been modified with one or more basic substances during their manufacture. The dyes are also useful as colorants in such compositions as inks, lacquers and plastic films.

Heretofore, o,o'-dihydroxy monoazo dyes have been chelated in aqueous systems with salts of metals such as chromium, copper, nickel, cobalt, manganese or iron. However, this is not possible with boron because the complex will not form under aqueous conditions. This non-aqueous medium used in the process of this invention makes it possible to produce the boron-chelated dyes, which have been known heretofore.

It is, therefore, the primary object of this invention to provide for a new class of boron-chelated o,o'-dihydroxy monoazo dyes. It is also an object to provide for a process of preparing such dyes.

These objects are accomplished by the present invention which provides boron-chelated o,o'-dihydroxy monoazo dyes having the formula:

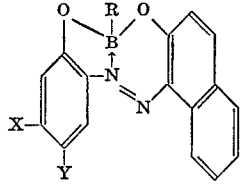

where R represents hydroxy, aryl, alkyl of from 1 to 8 carbon atoms and alkoxy of from 1 to 8 carbon atoms and X and Y each represent hydrogen, chloro or nitro, provided that where either X or Y is nitro the other is hydrogen.

Preferred dyes of the invention are those in which R is hydroxyl, butoxy, octyl or phenyl and at least one of X and Y is chloro or nitro.

In accordance with the process of the invention, the new dyes are prepared by reacting one mole proportion of an o,o'-dihydroxy-arylazo-aryl dye of the formula:

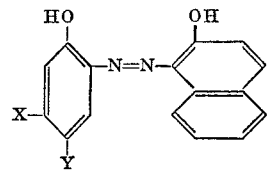

where X and Y are as defined above with at least one mole proportion of a polyoxyborane having the formula:

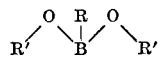

where R represents hydroxy aryl, alkyl of from 1 to 8 carbon atoms or alkoxy of from 1 to 8 carbon atoms and R' represents hydrogen or lower ($C_1$–$C_6$) alkyl, in a non-aqueous, non-polar organic solvent capable of forming an azeotrope with water, such as toluene, benzene, monochlorobenzene, o-dichlorobenzene, xylene, tetralene and the like.

In carrying out the reaction, the dye is mixed with the solvent and the polyoxyborane, preferably using a slight excess of the polyoxyborane (i.e., about 1.1 moles per mole of the dye) and the mixture heated at a temperature of from 80° C. to about 210° C., preferably at the reflux temperature of the solvent employed, the water formed in the reaction being removed azeotropically as it is formed.

The amount of solvent employed in the reaction should, of course, be sufficient to dissolve the dye reactant and provide for the azeotropic removal of the water in the course of the reaction.

The polyoxyboranes suitable for the process of the invention include boric acid; triesters of boric acid, such as the tri-n-propyl, butyl, amyl or hexyl borates, tri-sec-butyl borate, tri-tert.-butyl borate; boronic acids, alkyl boronic acids, such as normal butyl, amyl, hexyl or octyl boronic acid, aryl boronic acids, such as phenyl boronic acid, p-methoxyphenyl boronic acid, m-nitrophenyl boronic acid, tolyl boronic acid, or chlorophenyl boronic acid; and diesters of boronic acids such as di-ethyl, di-n-butyl, di-sec-butyl and di-tert-butyl phenyl borates. The boron chelates are very soluble in nonpolar solvents, and are best recovered by evaporation from the chelated reaction mixture.

The o,o'-dihydroxy monoazo dyes of the arylazo aryl type suitable for the practice of this invention, are prepared by coupling diazotized o-aminophenols or o-aminonaphthols with an appropriate phenol or naphthol at a position which is ortho to the hydroxyl group of the phenol or naphthol. Many examples of such chelatable dyes are to be found in the patent literature.

Suitable diazo components are 2-amino-4-chlorophenol, 2-amino-5-chlorophenol, 2-amino-4-nitrophenol, 2-amino-5-nitrophenol, 2-aminophenol, 2-amino-4-chloro-6-nitrophenol, 2-amino-4,5-dichlorophenol, 2-amino-1-naphthol, and 1-amino-2-naphthol.

Suitable coupling components are p-cresol, p-chlorophenol, p-tertiary butyl, 4-methyl-1-naphthol, 4-chloro-1-naphthol, 2-naphthol and 5- and 7-acetamido-2-naphthol.

The boron chelates thus prepared have the properties of disperse dyes. They can be dispersed readily in a dyebath by dissolving in acetone or an equivalent low molecular weight water-miscible solvent and adding to a water-bath containing a dispersing agent such as sodium lauryl sulfate.

The nature of the fiber dyed in such baths determines the optimum temperature at which the dyeing takes place, e.g., acetate at 180° F., nylon and cellulose triacetate at 208° F., and polyester or polypropylene modified with amine or amide, at 212° F. In dyeing polyester, a carrier is used in 0.15% concentration in the dyebath. Any standard carrier such as o-phenylphenol or a 50% methyl salicylate aqueous emulsion is suitable. Standard shades are produced by using 0.25% to 2% dye on the weight of the fiber. Yellow to orange to red to violet shades predominate among the o,o'-dihydroxy monoazo dye chelates prepared by the process of this invention.

The boron chelated dyes also disperse well in melted thermoplastics such as polystyrene, flexible vinyl and poly(methyl methacrylate) to give, on cooling, hues corresponding to those obtained on dyed synthetic fibers.

A further understanding of the present invention will be obtained from the following illustrative examples.

EXAMPLE 1

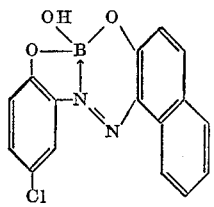

Chelation with boric acid

A mixture of 14.90 g. (0.05 mole) dye prepared by coupling diazotized 2-amino-4-chlorophenol to 2-naphthol, 3.05 g. (0.05 mole) boric acid and 400 ml. toluene is stirred at reflux until chelation is complete, about six hours. Water is removed azeotropically as formed. The whole is evaporated to dryness in rapid air stream at ambient temperature. The residue is ground, stirred in 100 ml. ethanol, filtered, washed with ethanol and dried, giving 13.27 g. product. The product dyes nylon and polyester fibers scarlet. It colors polystyrene plastic blue-red.

EXAMPLE 2

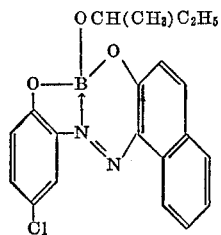

Chelation with an ester of boric acid (tri-sec-butylborate)

To 3 g. (0.01 mole) of the dye prepared by coupling diazotized 2 - amino - 4 - chlorophenol to 2-naphthol, in 100 ml. toluene, is added 5.0 ml. (0.018 mole) tri-secondary-butyl borate. The whole is heated at reflux, the dye going into solution and the solution changing from orange to red. When chelation is complete, the solution is filtered at the boil, cooled, again filtered and the filtrate evaporated. The residue is slurried in 15 ml. toluene, isolated and dried in a vacuum at 60° C. The yield of boron chelate of the dye is 1.7 g., M.P. 172-4° C. It dyes cellulose triacetate, polyesters, nylon, wool and modified polypropylene fibers red.

EXAMPLE 3

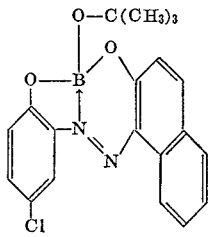

Chelation with an ester of boric acid (tri-tert.-butyl borate)

To 300 ml. toluene is added 14.90 g. (0.05 mole) of the dye prepared by coupling diazotized 2-amino-4-chlorophenol to 2-naphthol. The mixture is stirred at reflux, water being removed as an azeotrope. When the mixture is dry, 30 ml. (0.1 mole) tritertiary-butyl borate is added dropwise in three hours. The whole is heated at reflux until chelation is complete, about 3 hrs. The solution of chelate is passed through a column of chromatographic grade alumina and eluted with E.P. acetone. The eluant is evaporated to dryness. The residue is 12.03 g. of the boron chelate of the dye. It dyes polyester and modified polypropylene fibers red; it colors polystyrene plastic blue-red. It has excellent solubility in solvents used for ball point inks.

EXAMPLE 4

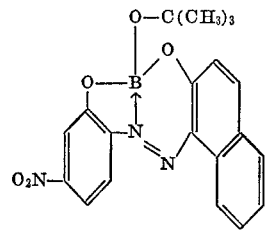

Chelation with an ester of boric acid (tri-tert.-butyl borate)

To 75 ml. toluene is added 3.09 g. (0.01 mole) of the dye prepared by coupling 2-amino-5-nitrophenol to 2-naphthol. The whole is heated to reflux to remove traces of water. To it is added 3.0 ml. (2.4 g. 0.01 mole) tritertiary butyl borate. The whole is heated at reflux until chelation is complete. It is cooled, diluted with 200 ml. petroleum ether. The boron chelate of the dye is filtered, washed with ether and dried. It is then dissolved in acetone, the solution clarified by filtration and then evaporated to dryness. The yield is 2.92 g. of product which dyes nylon fibers red shades.

EXAMPLE 5

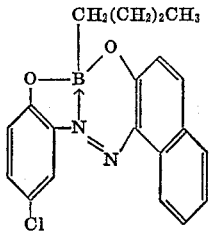

Chelation with an alkylboronic acid (n-butylboronic acid)

To 50 ml. toluene is added 2.98 g. (0.01 mole) of the dye prepared by coupling diazotized 2-amino-4-chlorophenol to 2-naphthol and 1.1 g. (0.011 mole) normal-butylboronic acid, n-$C_4H_9B(OH)_2$. The whole is heated at reflux until chelation is complete. It is then evaporated to dryness. The residue is taken up in ethyl acetate, put through an alumina column, concentrated by evaporation and again passed through the column. The eluant is evaporated to give 1.43 g. of final product which dyes nylon red and polyester fibers scarlet.

EXAMPLE 6

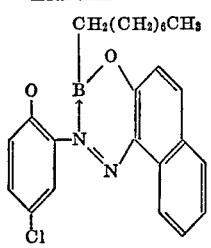

Chelation with an alkylboronic acid (n-octylboronic acid)

A mixture of 1.88 g. dye prepared by coupling diazotized 2-amino-4-chlorophenol to 2-naphthol, 1.00 g. n-octylboronic acid and 30 ml. toluene is heated at reflux for six hours. It is purified by passing through an alumina column, using acetone as eluent. The resulting solution of boron chelate is evaporated and dried to give 1.46 g. product, having maximum wavelength absorption at 560 m$\mu$. It dyes nylon a bluer shade of red than the n-butyl analogue.

EXAMPLE 7

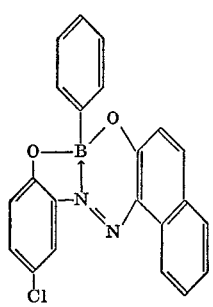

Chelation with an arylboronic acid (phenylboronic acid)

To 6.0 g. (0.02 mole) sample of the dye prepared by diazotizing 2-amino-4-chlorophenol and coupling to 2-naphthol there is added 200 ml. toluene and 3.6 g. (0.029 mole) phenylboronic acid. The whole is heated at reflux using a water trap to remove water as it is formed. When chelation is complete, the whole is filtered and the filtrate evaporated to dryness. The product is dissolved in 100 ml. hot ethanol, clarified, and the dye precipitated by adding water dropwise. The product is isolated and dried to give 6.4 g., M.P. 138–9° C. It provides red violet shades on cellulose triacetate, polyester, nylon and wool fibers.

It disperses well and develops good tinctorial power at 0.02% conc. in general purpose polystyrene and poly (methyl methacrylate) plastics.

EXAMPLE 8

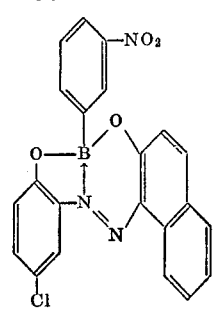

Chelation with arylboronic acid (m-nitrophenylboronic acid)

A mixture of 2.98 g. (0.01 mole) dye prepared by coupling 2-amino-4-chlorophenol to 2-naphthol, 1.67 g. (0.01 mole) 3-nitrophenylboronic acid and 50 ml. toluene is heated at reflux for eight hours. The resultant solution of boron chelate is put through an alumina column, evaporated to dryness, ground with petroleum ether, filtered, washed with ether and dried. The yield is 2.2 g. of final product. It dyes polyester and nylon fibers violet.

EXAMPLE 9

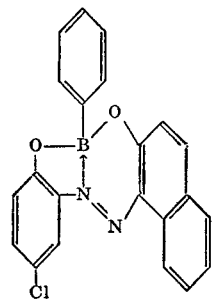

Chelation with an ester of an arylboronic acid di-(n-butyl) phenylboronate

To a dry mixture of 14.90 g. (0.05 mole) of the dye prepared by diazotizing 2-amino-p-chlorophenol and coupling to 2-naphthol in 400 ml. toluene is added 28.0 g. (0.012 mole) di(n-butyl) phenylboronate. The whole is heated at reflux until chelation is complete. The violet solution is put through two alumina columns, the eluant evaporated and the product dried. The product is ground with petroleum ether, filtered, washed with ether and dried. Yield is 17.57 g. As a disperse dye, it dyes nylon, modified polypropylene and polyester fibers strong violet shades.

EXAMPLE 10

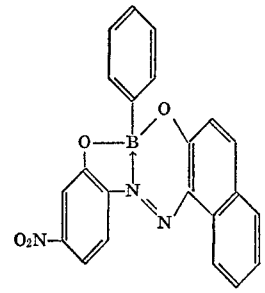

Chelation with an ester of an arylboronic acid

In the chelation process of Example 9, if the dye is replaced by 15.45 g. (0.05 mole) of the dye prepared by coupling diazotized 2-amino-5-nitrophenol to 2-naphthol. The product is isolated by evaporation, dissolved in hot ethyl acetate, put through an alumina column and isolated by evaporation and dried to give 7.95 g. boron chelate. As a disperse dye, it dyes nylon and polyester fibers a deep garnet shade.

I claim:
1. A boron chelated dye of the formula:

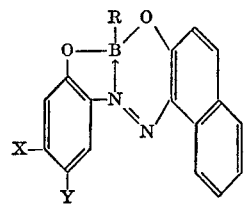

where R represents hydroxy, phenyl, p-methoxyphenyl, m-nitrophenyl, tolyl, chlorophenyl, alkyl of from 1 to 8 carbon atoms or alkoxy of from 1 to 8 carbon atoms, and X and Y each represent hydrogen, chloro and nitro, provided that where either X or Y is nitro the other is hydrogen.

2. The compound of claim 1 wherein R is hydroxy and X and Y are hydrogen and chloro, respectively.

3. The compound of claim 1 wherein R is tert.-butoxy and X and Y are nitro and hydrogen, respectively.

4. The compound of claim 1 wherein R is n-octyl and X and Y are hydrogen and chloro, respectively.

5. The compound of claim 1 wherein R is phenyl and X and Y are hydrogen and chloro, respectively.

References Cited

UNITED STATES PATENTS

| | | | |
|---|---|---|---|
| 1,877,615 | 9/1932 | Straub et al. | 260—151 |
| 2,013,091 | 9/1935 | Erskine et al. | 260—197 X |
| 2,120,799 | 6/1938 | Crossley et al. | 260—147 |
| 3,163,532 | 12/1964 | Schlesinger | 260—151 X |
| 3,180,831 | 4/1965 | Wisotsky et al. | 260—149 X |
| 3,300,472 | 1/1967 | Kleiman et al. | 260—149 |
| 3,424,739 | 1/1969 | Cope et al. | 260—148 |

OTHER REFERENCES

Sommer et al.: Collection Czechoslav. Chem. Communs., volume 22, pp. 1432 to 1439 (1957).

FLOYD D. HIGEL, Primary Examiner

U.S. Cl. X.R.

106—23, 288 Q; 260—37 R, 41 C, 149, 151, 202